March 1, 1932.  S. N BUCHANAN  1,847,169
BOX SUPPORT
Filed June 28, 1927   2 Sheets-Sheet 1

Inventor
STEPHEN N. BUCHANAN

March 1, 1932. S. N. BUCHANAN 1,847,169
BOX SUPPORT
Filed June 28, 1927 2 Sheets-Sheet 2
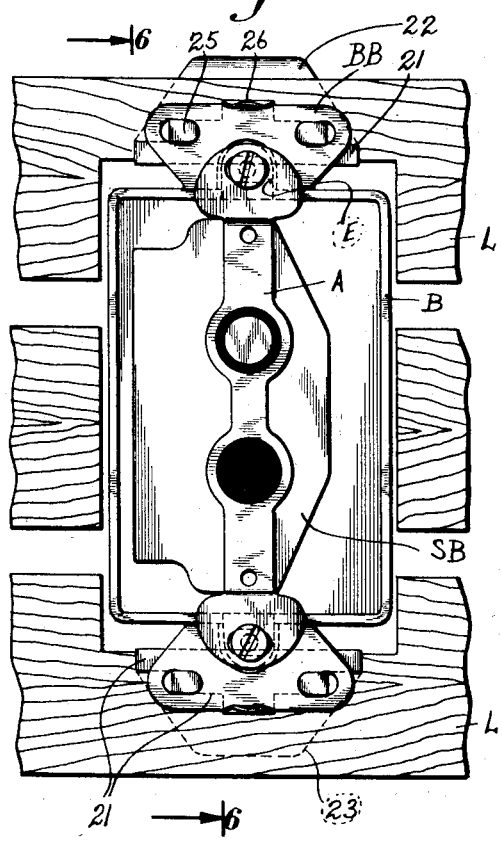
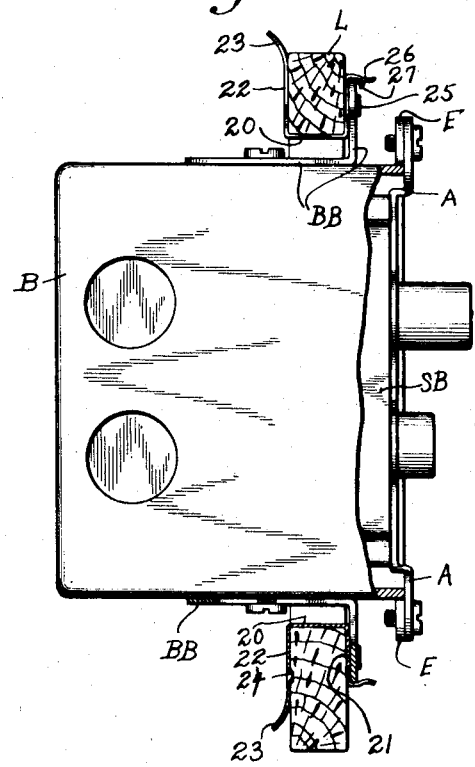
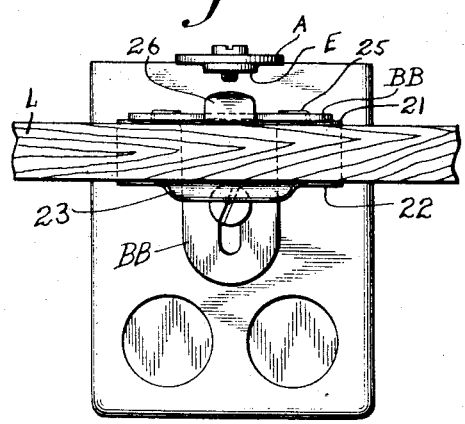
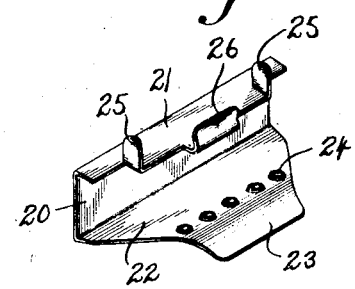
Inventor
STEPHEN N. BUCHANAN Patented Mar. 1, 1932

1,847,169

UNITED STATES PATENT OFFICE

STEPHEN N. BUCHANAN, OF NEW YORK, N. Y., ASSIGNOR TO THE THOMAS & BETTS CO., OF ELIZABETH, NEW JERSEY, A CORPORATION OF NEW JERSEY

BOX SUPPORT

Application filed June 28, 1927. Serial No. 202,070.

This invention relates to box supports for use in mounting electric outlet boxes and the like within the wall of a building.

One of the main purposes of the invention is to provide means to anchor a box on or in the wall or to the wall lath without employing screws, nails or other means of the usual and well known kind for securing the box to the wall.

A further object is to produce a one piece box support which is capable of being easily and quickly snapped or clipped onto the edge of the wall or to a lath, whereupon the box is then mounted on the support, the entire operation being carried out without the use of nails or screws which avoids splitting, breaking or damaging the wall or lath thereof.

A further object is to produce a box support which is also capable of holding a switch block, plug receptacle, or other electric contact making device within the box without the use of screws. In other words, this latter object is in addition to the first one stated so that by the use of my invention, a box, together with a switch block (or other electric contact making device, may be mounted in a wall without the use of screws or nails.

The accompanying drawings illustrate several examples of construction capable of being produced in accordance with principles of this invention.

Sheet 1 of the drawings shows one form of the box support capable of anchoring not only a box to a wall but also a switch block, i. e. the box support illustrated on Sheet 1 holds a switch block or other electric contact making device in a box and anchors the box to a wall, performing both functions without the use of screws or nails.

Sheet 2 of the drawings shows a modified form of the box support slightly modified in construction by which a box is secured to the wall but wherein the box support is not provided with means for fixing a switch block, plug receptacle or the like in the box. In other words, this second form of the invention shows a simple support for boxes only, it being necessary to screw fasten the switch block in the box in the usual way.

Figure 5 shows an open front box assembly view, the box support securing the box to the wall, but the switch block being screw fastened to the box.

Figure 6 shows a side view of the box assembly as taken on the line 6—6 of Figure 5.

Figure 7 is an end view of the box and switch block assembly, the box being held in the wall by the modified box support, while the switch block is held in the box by screws.

Figure 8 is a perspective view of the modified form of box support removed from other parts.

Figure 1:
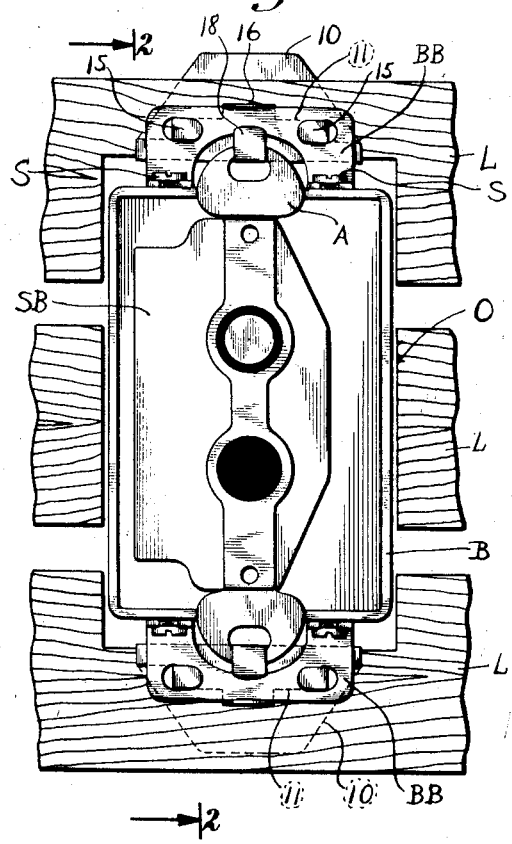
Figure 1 shows a front open box view, i. e. a box assembly including a switch block, or other like means, mounted in the box by the use of my improved box support.
Figure 2:
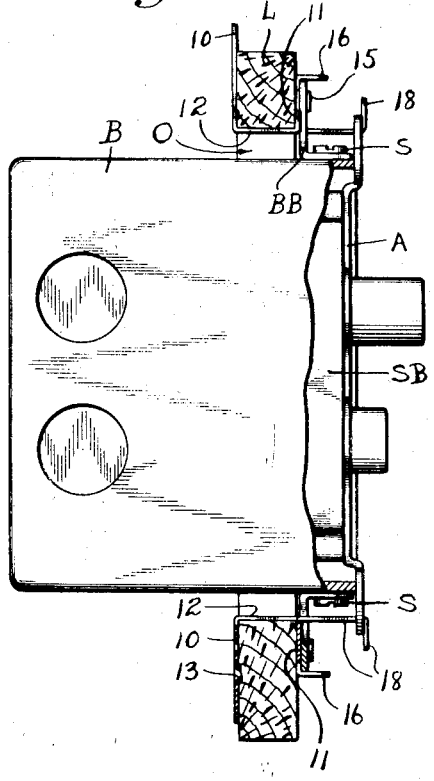
Figure 2 shows a side view of the box assembly as taken on line 2—2 of Figure 1 showing the box in partial section.
Figure 3:
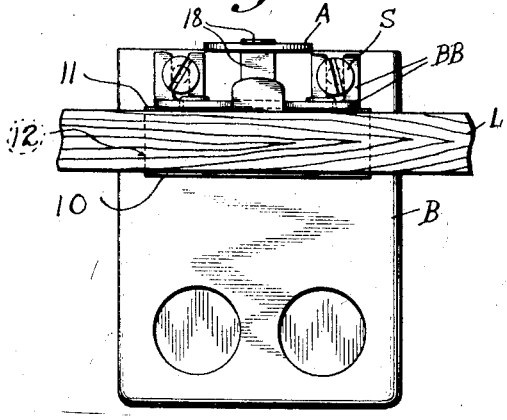
Figure 3 shows an end view of the box assembly, the box being located behind a lath and showing the jaw-like box support in position on the lath to grip and hold a box in the wall and a switch block in the box.

Referring further to the drawings for a more detailed description of the invention and first describing Sheet 1 construction, there is shown lath L of a building, the reference L designating in general any particular type of wall usually met with in building construction, whether made of lath or solid boards. It is the usual practice for the workman to cut an opening or hole O in the wall L for the reception of the box B. Heretofore it has been the practice to nail or screw fasten the box B to the wall L by nailing or screwing thru the box bracket BB carried at each end of the box with the result that the lath is split thus rendering the work faulty, but my invention improves this method of installation. The box bracket BB is usually adjustably attached to each end of the box by a screw S which is loosened to permit the bracket to slide relatively under the screw head, by which the height or distance of box B is adjusted to the desired position out from the wall L, as shown in Figure 2, whereupon the screw S is then tightened up. The box bracket BB may be reversed if need be so as to set the box B below the wall surface or out therefrom as building conditions require and depending somewhat on the thickness of the plaster on the wall.

A switch block SB, or any other like electrical contact make and break device such as a plug receptacle, is carried within the box B and electrical connections from a wire and cable system not shown is made in the box at the rear of the switch block. The switch block SB is ordinarily carried on a metal cross arm A reaching beyond each end of the box B and capable of being screw fastened to the box which is the old method long employed but which my invention eliminates if it is desired to use that improved form of box support shown in Sheet 1 because it is a combinational box and block or plug support.

Figure 4:
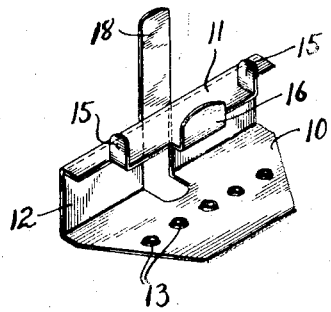
Figure 4 shows a perspective view of the box support separated from the other parts.

Referring now to Figure 4, an example of the box and switch block support will be described and thereafter it will be obvious how this one piece member may be used to anchor the box and switch block assembly in the wall opening O without the use of a single screw or nail.

The support device comprises a one piece member fashioned from sheet metal, say, cold rolled steel or other suitable material. Preferably sheet metal of light gauge may to advantage be used and I suggest cold rolled sheet material so that the jaw portions of the box support may tend to spring and clasp together and grip the opposite edges of the surface of the wall lath L.

Spring jaw portions 10 and 11 extend parallel and integral from a web 12. The member is generally U-shaped in cross section and springs or bends sufficiently to be slipped over the edge of a lath or edge of the wall. The inherent resistance of the spring jaws 10—11 clasps the member 12 onto the lath. I may prefer to serrate, punch up, or strike in teeth 13 on one engaging jaw portion 10 pointing toward the other portion 11 so that the serrations 13 burr or bite into the soft surface of the lath L thus holding the member 12 in place on the wall edge while the box and switch plug are being set into position.

The gripping or jaw portion 11 opposite the serrated jaw 10 is made with anchorage lips or ears to engage and hold the box and a switch block or plug receptacle SB. To this end the box engaging ears 15 are spaced apart towards the opposite ends of the upper or outer jaw 11 while a central ear 16 may also be formed thereon if desired. The ears 15 and 16 are designed to bend over a box portion or box means, i. e. engage the box bracket BB, the box B and its brackets BB being simply considered as one and the same member. Usually the box ears 15 are sufficient for all practical purposes and the ear 16 therebetween may in some cases be dispensed with if desired. Thus the member 12 may be clipped into the wall opening O over the lath edge at each end of the box B so that the ears 15 pass through the nail holes in the box means BB and bend over to hold the box in position in the opening O. The main anchorage ears 15 are therefore made on the box support 12 to fit thru the nail holes in the box bracket and take the place of nails or screws.

What is of further importance in this first form of the invention being described is means on the box support 12 to fix the switch block SB within the box and such means comprises a long lip 18 which to advantage may be cut from the stock of the box support. The example of the box support shown simply provides the switch block lip 18 as punched from the member 12 beginning at the junction of a leg of the U and the portion of the U joining the legs and upturned in parallel relation to the other ears 15 and 16. The switch block lip 18 is therefore sufficiently long to reach outwardly from the surface of the wall L and pass through the hole in the switch arm A and is bent over to fix the electrical device SB in the box.

It is observed therefore that a box support 12 is used at each end of the box B, and that an ear 15 or a plurality of ears 15 and 16 are passed through the box bracket BB and bent over to hold the box in place. At the same time the single lip 18 reaches through the hole in the switch plug arm A and bends over to hold the latter in the box. In this method of installation, no screws or nails are employed. The installation is simple and quick in its application. The wall is not split and broken.

Reference will now be made to Sheet 2 for a description of the box support modified in certain particulars, the principle in general being the same as that heretofore described. Reference will first be made to Figure 8 showing the modified box support which is designed to hold a box only upon or in the wall, leaving the switch block SB to be screw fastened in the box as in the old practice.

A box support 20 is made with spring jaw-like portions 21—22 adapted to spring into place and grip the edge of the lath L. One spring jaw 22 may be curved as at 23 so as to afford a wide opening and to facilitate mounting the box support on the lath edge as shown in Figure 6 and in Figure 2 as well, since the curved formation 23 is applicable to either box support 12 or 20. The longer spring jaw 22 may be provided with serrations or teeth 24 to bite into the lath and initially hold the support in position while the box itself is being placed. The outer spring jaw 21 is made with box anchorage ears 25 to engage and bend over a box portion such as the box bracket BB.

If desired, a central box anchorage ear 26 may also be upturned on the spring jaw 21 to engage the outer edge of the box bracket BB and act as additional holding means. The curved snap-in spring ear 26 has its base pressed outwardly at 27 to provide an indent snap-in space to receive the outer thin edge of the box bracket BB as shown, and thus the box is held in by two opposing spring ears 26 on the two box supports at each end of the box so that the box may be temporarily held in position without bending over the ears 25 thereby giving the mechanic freedom of action and an opportunity to mount the box and remove it in the course of making the installation, and finally the box is permanently anchored by bending the ears 25, and 26 as well, over on the box bracket and lightly hammering or merely pressing them by hand down into final position.

The box supports illustrated in the several views of both sheets have one spring jaw 10 and 22 made somewhat larger than the other. These jaws 10 and 22 having a substantially large spread, engage a relatively large surface on the back of the wall or lath L thus establishing a firm anchorage on the wall. It is sufficient for the outer spring jaw to be made somewhat narrower if desired and thus occupy less space on the front surface of the lath than it would thus occupy if made large in size similar to the rear jaw.

The box support 20 just described omits the switch block anchorage lip 18 used in the first box support described. Thus it is necessary in this modified form of the device to screw fasten the switch arm A onto the box. For this purpose a box B of standard make is employed which carries an integral ear E on each end thereof as shown. Not infrequently it may be desirable to manufacture this type of box support shown in Figure 8 and thus leave it to the mechanic on the job to screw fasten the switch block SB onto the box ears E with screws in the usual manner.

Both forms of the box support described, others being possible in accordance with the principles of this invention, are adapted for use in both old and new house work. For old house work, it is only necessary to cut an opening in the plastered and lath wall and to trim away the plaster sufficiently for the insertion of the spring jaws of either type 12 or 20 over the edge of the lath. On the other hand, for new house work, the box and cable installations are usually made before the plaster is applied and the plaster is run up close to the box and completely imbeds the box supports rendering them permanently a part of the wall and house structure.

The use of this box support simplifies the work. Particularly, the support 12 greatly reduces the work because it anchors the switch block in the box at the same time it anchors the box in the wall. For certain class of work, however, there is provided the box support 20 so that the mechanic may still screw fasten the electric switch or plug in the box if he so desires.

After the box and electrical switch or other plug device is installed, a cover plate, not shown, is mounted to enclose the box and switch and is attached by screws onto the box in the usual way.

What is claimed is:

1. A box support comprising, a one piece sheet metal structure fashioned into a pair of jaws adapted to embrace a wall, two ears integral with and spaced apart on the support to engage the spaced openings in a box bracket, and a third upstanding ear adapted to be bent over the edge of the box bracket between the two ears.

2. A box support comprising, wall gripping jaws fashioned from a single sheet of material, ears carried by the support to engage a box bracket, and means carried with the support to engage an electric circuit making and breaking device to hold the latter in the box.

3. A box support comprising, wall gripping jaws fashioned from a single sheet of material, ears carried by the support to engage a box bracket, and a lip upstanding from one of the jaws to bend over and fix an electric contact device in a box.

4. A box support as defined in claim 3 wherein the lip is relatively longer than the ears to reach out from the wall and bend over an electric contact plug frame.

5. An electrical switch box comprising a switch box, an electrical switch adapted to be secured within the box, a support to attach the box to a wall, means to secure the box to the support, and a lip carried by the support to engage the switch to secure the switch within the box.

6. An electrical switch box comprising a switch box, an electrical switch adapted to be secured within the box, a support adjustably attached to the box for securing the box to a wall, and a long lip carried by the support to provide for adjustment of the support relatively to the box to engage the switch to secure the switch within the box.

7. An electrical switch box comprising a switch box, an electrical switch adapted to be secured within the box, a bracket adjustably secured to the box, a support secured to the bracket for attaching the box to a wall, and a long lip carried by the support to provide for adjustment of the bracket relatively to the box to engage the switch to secure the switch within the box.

8. An electrical switch box comprising a switch box, an electrical switch adapted to be secured within the box, a support to attach the box to a wall, at least one ear carried by the support to attach the box thereto, and a lip carried by the support to engage the switch to secure the switch within the box.

9. A box support comprising a sheet metal U-shaped structure adapted to embrace a wall, a lip cut from a point beginning at the junction of a leg of the U and the portion joining the legs and bent to project upwardly from the support, and means to secure a box bracket to the support.

10. A box support comprising a sheet metal U-shaped structure adapted to embrace a wall, a lip cut from a point beginning at the junction of a leg of the U and the portion joining the legs and bent to project upwardly from the support, and at least one upstanding ear projecting from the support to secure a box bracket thereto.

11. An electrical box assembly comprising a box, an electrical device adapted to be secured within the box, a support to attach the box to a wall, means to secure the box to the support, and a bendable lip carried by the support engaging the electrical device to secure the latter within the box.

12. An electrical box assembly comprising a box, an electrical device adapted to be secured within the box, a support to attach the box to a wall, means to secure the box to the support, and means carried by the support engaging the electrical device to secure the latter within the box.

In testimony whereof I affix my signature.

STEPHEN N. BUCHANAN.